(12) United States Patent
Gao et al.

(10) Patent No.: US 11,699,297 B2
(45) Date of Patent: Jul. 11, 2023

(54) IMAGE ANALYSIS BASED DOCUMENT PROCESSING FOR INFERENCE OF KEY-VALUE PAIRS IN NON-FIXED DIGITAL DOCUMENTS

(71) Applicant: salesforce.com, inc., San Francisco, CA (US)

(72) Inventors: Mingfei Gao, Sunnyvale, CA (US); Zeyuan Chen, Mountain View, CA (US); Le Xue, Mountain View, CA (US); Ran Xu, Mountain View, CA (US); Caiming Xiong, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 276 days.

(21) Appl. No.: 17/140,987

(22) Filed: Jan. 4, 2021

(65) Prior Publication Data
US 2022/0215195 A1    Jul. 7, 2022

(51) Int. Cl.
*G06V 30/413* (2022.01)
*G06F 40/186* (2020.01)
*G06F 40/289* (2020.01)
*G06V 30/412* (2022.01)
*G06F 40/295* (2020.01)
(Continued)

(52) U.S. Cl.
CPC .......... *G06V 30/413* (2022.01); *G06F 40/186* (2020.01); *G06F 40/289* (2020.01); *G06V 30/412* (2022.01); *G06F 40/295* (2020.01); *G06V 10/40* (2022.01); *G06V 30/10* (2022.01)

(58) Field of Classification Search
None
See application file for complete search history.

(56) References Cited

U.S. PATENT DOCUMENTS

| 8,880,540 | B1 | 11/2014 | Sampson et al. |
| 10,878,234 | B1 * | 12/2020 | Adam ............... G06V 30/19173 |
| 11,501,210 | B1 * | 11/2022 | Zhdanov ................ G06N 20/00 |

(Continued)

OTHER PUBLICATIONS

Wang, Zilong, Mingjie Zhan, Xuebo Liu, and Ding Liang. "Docstruct: A multimodal method to extract hierarchy structure in document for general form understanding." arXiv preprint arXiv:2010.11685 (2020). (Year: 2020).*

(Continued)

*Primary Examiner* — Frank D Mills
(74) *Attorney, Agent, or Firm* — Fenwick & West LLP (57) ABSTRACT

An online system extracts information from non-fixed form documents. The online system receives an image of a form document and obtains a set of phrases and locations of the set of phrases on the form image. For at least one field, the online system determines key scores for the set of phrases. The online system identifies a set of candidate values for the field from the set of identified phrases and identifies a set of neighbors for each candidate value from the set of identified phrases. The online system determines neighbor scores, where a neighbor score for a candidate value and a respective neighbor is determined based on the key score for the neighbor and a spatial relationship of the neighbor to the candidate value. The online system selects a candidate value and a respective neighbor based on the neighbor score as the value and key for the field.

20 Claims, 6 Drawing Sheets

| Field | Key Scores | Candidate Values | Neighbor Scores |
|---|---|---|---|
| Invoice Number → | "Bill To": 0.20<br>"John Smith": 0.14<br>"Invoice #": 0.98<br>"Invoice Date": 0.78<br>"11/2/2019": 0.11<br>.<br>.<br>. → | "100.00"<br>"US-001"<br>"11/2/2019"<br>"2"<br>.<br>.<br>. → | {"100.00","Unit Price",0.67}<br>{"100.00","200.00",0.25}<br>{"US-001","11/2/2019",0.43}<br>{"US-001","Invoice #",0.92}<br>{"11/2/2019","Invoice Date",0.35}<br>.<br>.<br>. |

(51) Int. Cl.
*G06V 30/10* (2022.01)
*G06V 10/40* (2022.01)

(56) References Cited

U.S. PATENT DOCUMENTS

| | | | |
|---|---|---|---|
| 2015/0310269 A1 | 10/2015 | Urbschat et al. | |
| 2016/0063322 A1* | 3/2016 | Déjean | G06V 30/412 |
| | | | 382/176 |
| 2020/0074169 A1* | 3/2020 | Mukhopadhyay | G06Q 50/18 |
| 2020/0117944 A1* | 4/2020 | Duta | G06V 30/224 |
| 2020/0159820 A1* | 5/2020 | Rodriguez | G06F 40/186 |
| 2021/0110527 A1* | 4/2021 | Wheaton | G06F 40/284 |
| 2021/0201018 A1* | 7/2021 | Patel | G06V 10/98 |
| 2021/0240932 A1* | 8/2021 | Erdemir | G06V 30/414 |
| 2021/0240973 A1* | 8/2021 | Erdemir | G06V 30/412 |

OTHER PUBLICATIONS

PCT International Search Report and Written Opinion, PCT Application No. PCT/US2021/056487, dated Feb. 28, 2022, 12 pages.
Amazon, "Amazon Textract," Date Unknown, nine pages, [Online] [Retrieved on Jan. 19, 2021] Retrieved from the Internet <URL: https://aws.amazon.com/textract/>.
Amazon Web Services, Inc., "Amazon Textract," Date Unknown, one page, [Online] [Retrieved on Jan. 19, 2021] Retrieved from the Internet <URL: https://docs.aws.amazon.com/govcloud-us/latest/UserGuide/govcloud-txtrct.html>.
Google Cloud, "Document AI," Date Unknown, nine pages, [Online] [Retrieved on Jan. 19, 2021] Retrieved from the Internet <URL: https://cloud.google.com/document-ai>.
Microsoft Azure, "Form Recognizer," Date Unknown, 18 pages, [Online] [Retrieved on Jan. 19, 2021] Retrieved from the Internet <URL: https://azure.microsoft.com/en-us/services/cognitive-services/form-recognizer/>.
Microsoft Azure, "Announcing Form Recognizer: Create real value in your business processes by automating extraction of text, key value pairs and tables from forms," Date Unknown, two pages, [Online] [Retrieved on Jan. 19, 2021] Retrieved from the Internet <URL: https://azure.microsoft.com/en-us/resources/videos/build-2019-announcing-form-recognizer/>.
Rawat, M., "Google Introduces Document AI (DocAI) Platform For Automated Document Processing," Nov. 5, 2020, four pages, [Online] [Retrieved on Jan. 19, 2021] Retrieved from the Internet <URL: https://www.marktechpost.com/2020/11/05/google-introduces-document-ai-docai-platform-for-automated-document-processing/>.

* cited by examiner

| Field | Key Scores | Candidate Values | Neighbor Scores |
|---|---|---|---|
| Invoice Number | "Bill To": 0.20<br>"John Smith": 0.14<br>"Invoice #": 0.98<br>"Invoice Date": 0.78<br>"11/2/2019": 0.11<br>. . . | "100.00"<br>"US-001"<br>"11/2/2019"<br>"2"<br>. . . | {"100.00","Unit Price",0.67}<br>{"100.00","200.00",0.25}<br>{"US-001","11/2/2019",0.43}<br>{"US-001","Invoice #",0.92}<br>{"11/2/2019","Invoice Date",0.35}<br>. . . |

IMAGE ANALYSIS BASED DOCUMENT PROCESSING FOR INFERENCE OF KEY-VALUE PAIRS IN NON-FIXED DIGITAL DOCUMENTS

BACKGROUND

This invention generally relates to processing digital documents, and more specifically to inferring key-value pairs in non-fixed digital documents using image analysis of digital documents.

Entities, such as different types of organizations, process many digital documents that may include information related to operational processes of the entity. Information may be extracted from a document to perform or assist one or more tasks of an operational process. Among other types of documents, a form may structure the information into a set of fields that each have one or more key-value pairs. A field may characterize a respective type of information to be extracted from the document. A key for a field may refer to a label the respective field is called on the form document, and may vary, for example, depending on the naming conventions used by the responsible entity for the form.

Since an entity may process a significant number of documents on a frequent basis, it is advantageous to automatically extract information from key-value pairs on form documents without a human operator. Analysis of digital documents typically comprises receiving an image representation of the document, performing image analysis, optical character recognition, and use of artificial intelligence techniques, for example, machine learning techniques such as deep learning based neural networks. These techniques train a machine learning based model such as a convolutional neural network and apply the trained neural network to images representing new digital documents. These techniques typically work for a prefixed set of fields. However, while some types of form documents are standardized and have fixed locations for key-value pairs, many types of form documents are non-fixed in that the type and format of information vary depending on, for example, the entity issuing the form. This variation for non-fixed forms makes it difficult to automatically extract information.

The figures depict various embodiments of the present invention for purposes of illustration only. One skilled in the art will readily recognize from the following discussion that alternative embodiments of the structures and methods illustrated herein may be employed without departing from the principles of the invention described herein.

The figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "client device 110" in the text refers to reference numerals "client device 110A" and/or "client device 110B" in the figures).

DETAILED DESCRIPTION

Overview

An online system extracts information from digital documents. In one embodiment, the method employed by the online system allows information to be extracted from non-fixed form documents that may have varying layouts and arrangements of information. Specifically, the online system receives an image of a form document from a client device. The form document may include key-value pairs for a set of fields. In one embodiment, the online system also obtains a template indicating one or more fields to extract from the form image, in which a field may be associated with a set of candidate keys for the field. The online system obtains a set of phrases and locations of the set of phrases on the form image.

For at least one field, the online system determines key scores for the set of phrases, where a key score for a phrase indicates a likelihood that the phrase is a key for the field on the form image. The online system identifies a set of candidate values for the field from the set of identified phrases and identifies a set of neighbors for each candidate value from the set of identified phrases. The online system determines neighbor scores, where a neighbor score for a candidate value and a respective neighbor is determined based on the key score for the neighbor and a spatial relationship of the neighbor to the candidate value. The online system selects a candidate value and a respective neighbor based on the neighbor score and sets the selected candidate value as the value for the field and the selected neighbor as the key for the field. The disclosed techniques can automatically process non-fixed forms, i.e., forms that have non-fixed structure.

System Environment

Figure 1:
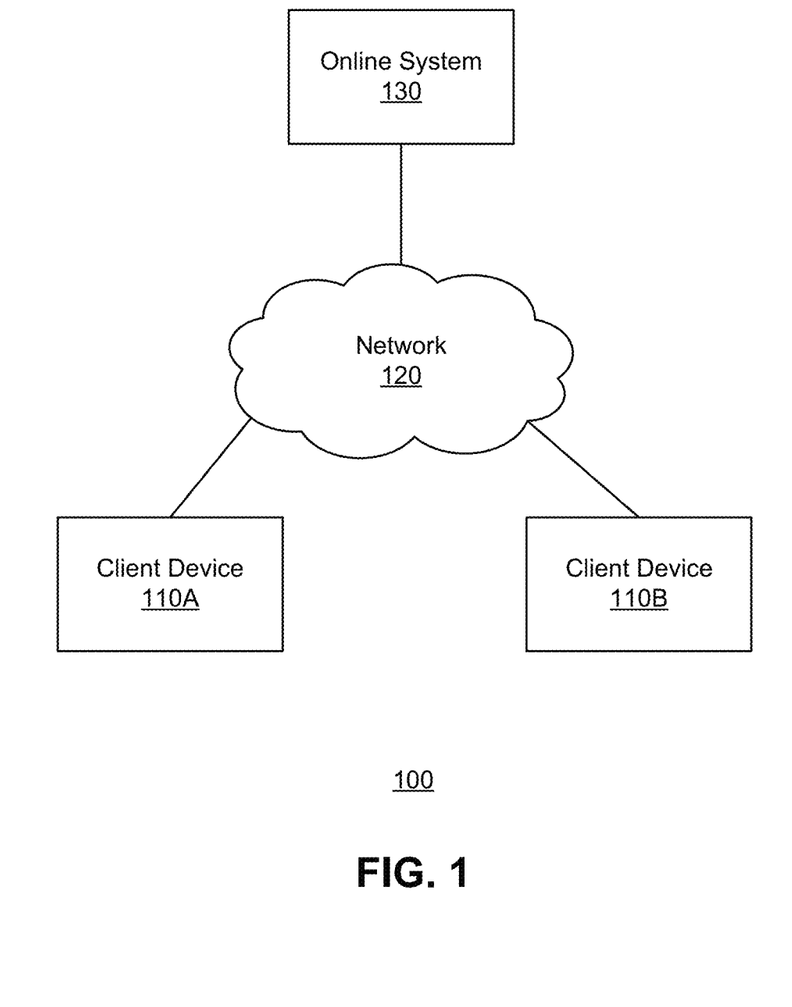
FIG. 1 is a block diagram of a system environment including an online system, in accordance with an embodiment.

FIG. 1 is a block diagram of a system environment 100 including an online system 130, in accordance with an embodiment. The system environment 100 shown in FIG. 1 comprises an online system 130, client devices 110A, 110B, and a network 120. In alternative configurations, different and/or additional components may be included in the system environment 100.

The online system 130 is a system that receives requests to process digital documents and provides information extracted from the digital documents to the user of the request. Entities, such as business or government organizations, process many documents that may include information related to operational processes of the entity, such as financial transactions, onboarding new employees to a company, or launching a new product. Information may be extracted from a document to perform or assist one or more tasks of an operational process. For example, the document may be an invoice for a service provided to a business organization, and the invoice may be processed by an employee of the organization such that the payment can be made to the vendor. As another example, the document may be a mortgage application to a lending organization, and the mortgage application may be processed by an underwriter to determine whether the application can be approved.

Among other types of documents, a form may structure the information into a set of fields that each have one or more key-value pairs. A field may characterize a respective type of information to be extracted from the document. For example, the field of an invoice number may characterize an identifier unique to each invoice. A key for a field may refer to a label the respective field is called on the form document, and may vary, for example, depending on the naming conventions used by the responsible entity for the form. For example, a key for the invoice number for a vendor may be labeled "Invoice #," while a key for the invoice number for another vendor may be labeled "Invoice No." A value for a field may refer to the data value for the field on the form document and may follow the format used by the responsible entity for the form. For example, a value for the invoice number may be "INV-023-US."

Typically, a human operator extracts information from documents and performs one or more tasks, such as entering it into records or making payments based on the extracted information. Since an entity may process a significant number of documents on a frequent basis, it is advantageous to automatically extract information from key-value pairs on form documents without a human operator so that processing can be done more efficiently. Some types of form documents are standardized and have fixed locations for key-value pairs on the document that may enable a computerized system to automatically extract information, since the locations of the keys and the values are already known. For example, a driver's license for a state may include information for the same set of fields (e.g., name, address, eye color) and a uniform layout of key-value pairs for these fields across individuals residing in that state.

However, many types of form documents are non-fixed in that the type and format of the information vary depending on, for example, the entity issuing the form. For example, a mortgage application from one lender may include different types of fields than a mortgage application from another lender because each lender considers different types of information from an applicant. As another example, an invoice from a plumbing vendor may arrange the key-value pairs for the fields of invoice number and the amount owed differently than an invoice from another vendor that both have to be processed by the same company. Since the type and format of information on these forms is not standardized or fixed, this variation for non-fixed forms makes it difficult to automatically extract information.

Thus, in one embodiment, the online system 130 provides a way to extract information from non-fixed digital documents. The online system 130 receives, from client devices 110, requests to process digital documents and provides information extracted from the digital documents to the user of the request. In one embodiment, the online system 130 is managed by the same entity as the client devices 110 of the requests and may be an internal system owned by the entity. In another embodiment, the online system 130 is managed by a different entity as the client devices 110 of the requests and may be a separate system. For example, the online system 130 may receive requests from client devices 110 from employees of different companies that need to process documents.

Figure 2:
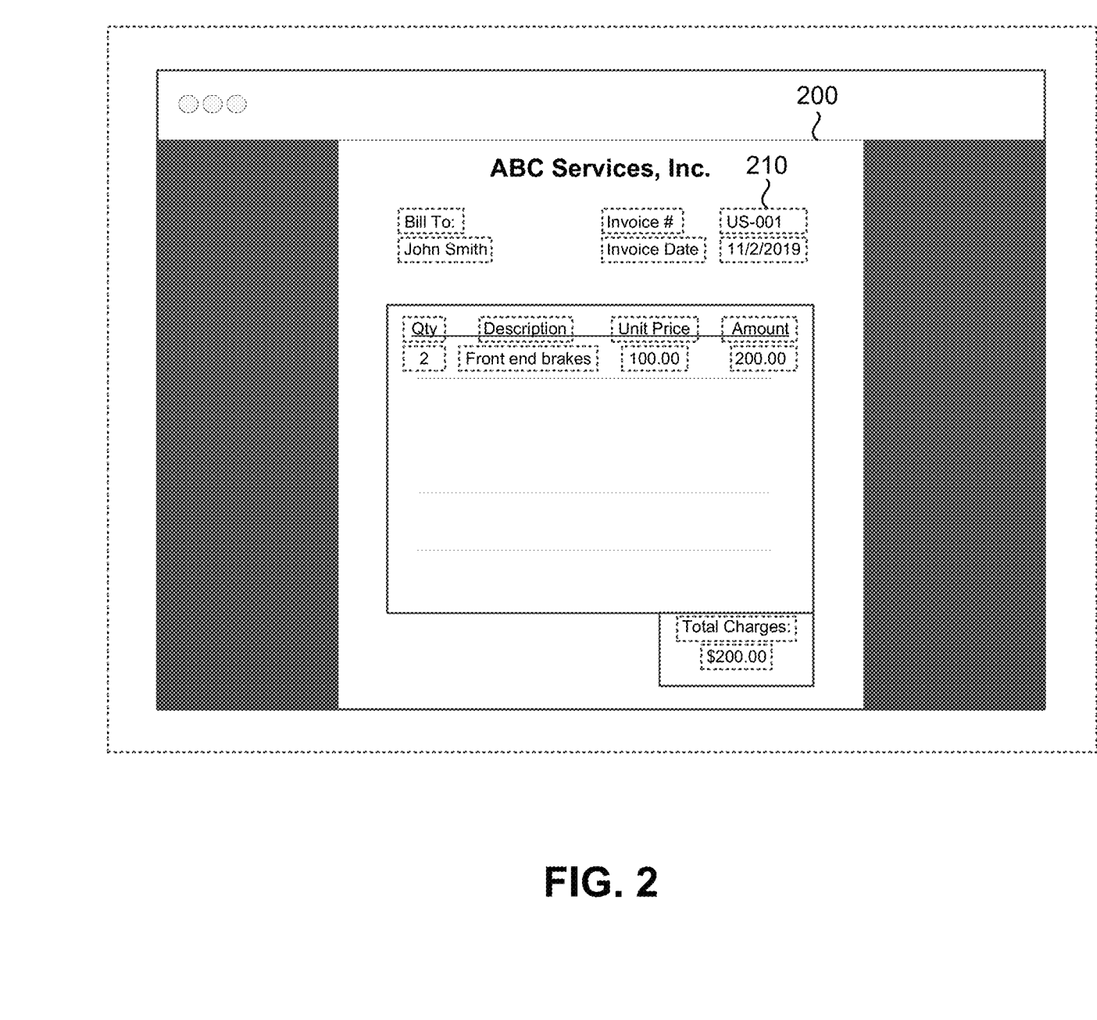
FIG. 2 illustrates an example document and a set of phrases identified in the invoice document, in accordance with an embodiment.
Figure 3:
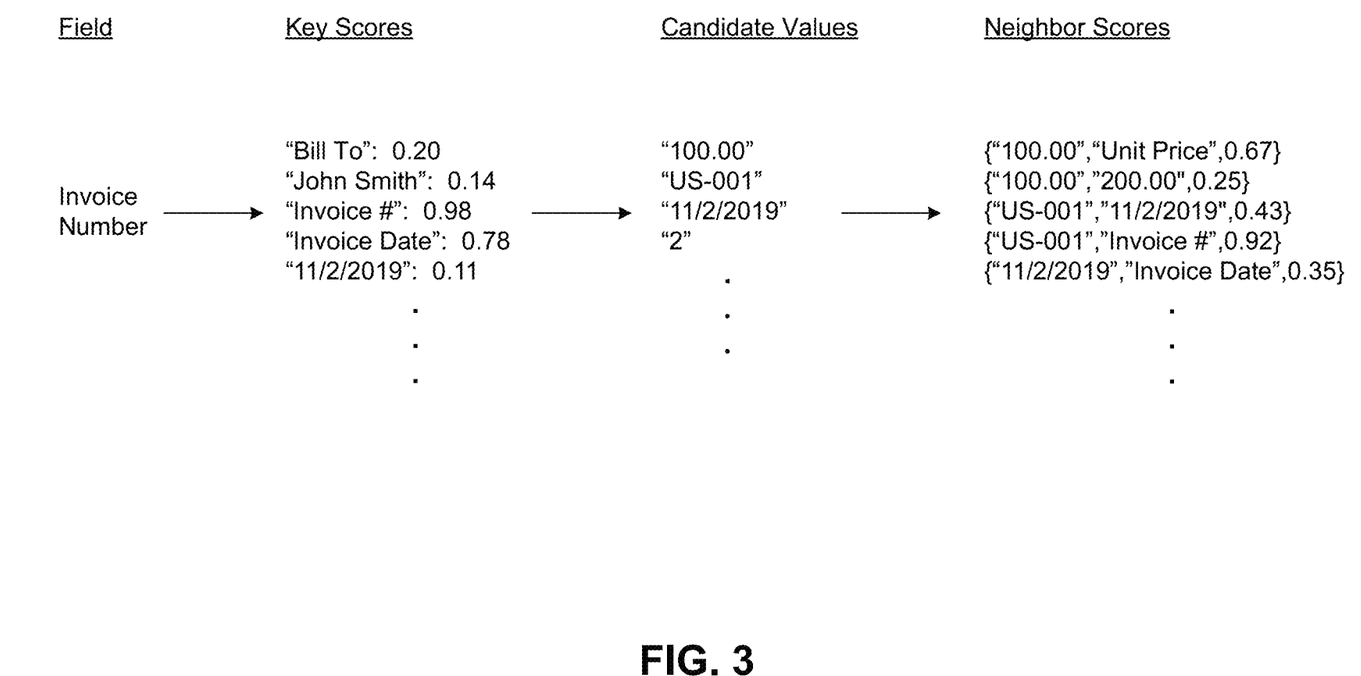
FIG. 3 is an example high-level process for determining key-value pairs in the example invoice document of FIG. 2, in accordance with an embodiment.

FIG. 2 illustrates an example invoice document and a set of phrases identified in the invoice document, in accordance with an embodiment. FIG. 3 is an example high-level process for determining key-value pairs in the example invoice document of FIG. 2, in accordance with an embodiment. Specifically, the online system 130 receives a request including an image of a document from a client device 110. In one instance, the document for the request is a form document that includes information in the form of key-value pairs for a set of fields. The image of the document may be received in the form of a computerized image file, such as JPEG, GIF, PNG, EPIS, AI, PDF, RAW, TIFF, or the like, but it is appreciated that the document may be received in other formats.

As shown in FIG. 2, the example illustrates an image 200 of a form for an invoice issued by a company "ABC Services, Inc." In particular, the image 200 may be a non-fixed form because the type and format of information for invoices may vary according to, for example, the company issuing the invoice. Among others, the image 200 includes key-value pairs for a set of fields that are to be extracted by the online system 130. In particular, the image 200 includes key-value pairs {"Bill To:", "John Smith"} for a field of invoice recipient, {"Invoice #", "US-001"} for a field of invoice number, {"Invoice Date", "11/2/2019"} for a field of invoice date, {"Qty", "2"} for a field of item quantity, {"Description", "Front end brakes"} for a field of item description, {"Unit Price", "100.00"} for a field of item unit price, {"Amount", "200.00"} for a field of item price, and {"Total Charges", "$200.00"} for a field of total invoice amount that are not yet known and are to be extracted by the online system 130.

The online system 130 obtains a set of phrases and locations of the phrases on the document. A phrase may include one or more words that are positioned spatially close to one another on the document. In one instance, the set of phrases and the locations may be identified as having a bounding box around each phrase on the document and determining the location of the bounding box as the location of the respective phrase. For example, as shown in FIG. 2, the online system 130 may identify a set of bounding boxes (in dotted lines) for a set of phrases "Bill To:," "John Smith," "Invoice #," "US-001," "Invoice Date," "11/2/2019," "Qty," "Description," "Unit Price," "Amount," "2," "Front end brakes," "100.00," "200.00," "Total Charges:," and "$200.00." Each bounding box encloses a respective phrase and the location of the bounding box (e.g., location of the center of the box) may be determined as the location of the respective phrase on the image 200 of the document.

For the request, the online system 130 may also obtain a form template including a set of fields to extract from the form, and one or more candidate keys or a known key for each field. Specifically, a candidate key for a respective field is a phrase that is a likely candidate for the key of the field on the document when the label for the key is unknown. In the example of FIGS. 2 and 3, the online system 130 may obtain a form template that specifies one or more candidate keys {"Invoice No.," "Invoice #," "Invoice Number"} for the field of invoice number that are likely candidates that the key for the field is labeled in the form.

In one embodiment, the online system 130 may receive a customized form template from the user of the request that specifies at least a part of the form template, for example, the candidate keys for a field. Since the user of the request is likely more familiar with the document, receiving a customized form template along with the document allows the online system 130 to have access to phrases that are likely candidates for keys of the document. In another embodiment, the online system 130 may not receive a form template or receive a partially complete form template from the request and determine the set of fields and the one or more candidate keys internally. For example, the online system 130 may determine this information based on the type of form by storing the templates for previously processed documents based on a category, e.g., invoices, mortgage applications, documents from different government agencies, and the like. The online system 130 may determine an appropriate category for an incoming form and retrieve the template from a previously processed document of the same category and assign the retrieved template as the template for the incoming document.

For at least one field, the online system 130 determines key scores for the set of phrases, where a key score for a phrase indicates a likelihood that the phrase is a key for the field on the image. In one instance, the key score for a phrase for a given field is determined based on a matching between the phrase and the candidate keys for the field, such that the key score for the phrase is higher if the phrase is similar to the candidate keys for the field. As shown in FIG. 3, for a field of invoice number, the online system 130 determines key scores for the set of identified phrases based on the candidate keys for the field. In particular, the phrase "Invoice #" has the highest key score because it substantially or identically matches a candidate key for the field.

The online system 130 also identifies a set of candidate values for the field from the set of phrases and identifies a set of neighbors for each candidate value from the set of phrases. In one instance, the candidate values are determined by first identifying a data type for the value of the field (e.g., cardinal, date, text string), and selecting only those phrases that match the data type. As shown in FIG. 3, the online system 130 identifies a data type for the field of invoice number as a text string or cardinal, and selects a subset of phrases including "100.00," "US-001," "11/2/2019," and "2" that include numbers or text as candidate values for the field.

The online system 130 determines neighbors for each candidate value that are spatially close to the candidate value on the document. For example, in FIG. 2, a set of neighbors for the candidate value "100.00" may include "Unit Price," "200.00," "Front end brakes" since their spatial locations on the document are close to the location of the candidate value. The online system 130 determines neighbor scores, where a neighbor score for a candidate value and a respective neighbor is determined based on the key score for the neighbor and a spatial relationship of the neighbor to the candidate value. As shown in FIG. 3, the online system 130 identifies neighbor scores for candidate value-neighbor pairs, and among those, candidate value "US-001" and its neighbor "Invoice #" have the highest neighbor score of 0.92, since the neighbor "Invoice #" is associated with a high key score, and is located spatially close to the candidate value of "US-001."

The online system 130 selects a candidate value and a respective neighbor based on the neighbor score and sets the selected candidate value as the value for the field and the selected neighbor as the key for the field. In the example of FIGS. 2 and 3, the online system 130 selects the key for the field of invoice number as "Invoice #" and the value for the field as "US-001," since the neighbor score for the pair is highest among other pairs for the field. The online system 130 may repeat this process for other fields specified in the document template to extract the remainder of the information in the form of key-value pairs.

Returning to FIG. 1, the client device 110 is a computing device such as a smartphone with an operating system such as ANDROID® or APPLE® IOS®, a tablet computer, a laptop computer, a desktop computer, or any other type of network-enabled device. A typical client device 110 includes the hardware and software needed to connect to the network 122 (e.g., via WiFi and/or 4G, 5G or other wireless telecommunication standards). The client device 110 allows a user to submit requests to the online system 130 to extract information from documents. The client device 110 may include an operating system and various applications that run on the operating system that enable the users to submit the requests. For example, the client device 110 may be include browser applications or standalone applications deployed by the online system 130 that allow users of an organization to interact with the online system 130 to submit the requests.

The network 122 provides a communication infrastructure between the worker devices 110 and the process mining system 130. The network 122 is typically the Internet, but may be any network, including but not limited to a Local Area Network (LAN), a Metropolitan Area Network (MAN), a Wide Area Network (WAN), a mobile wired or wireless network, a private network, or a virtual private network.

Online System

Figure 4:
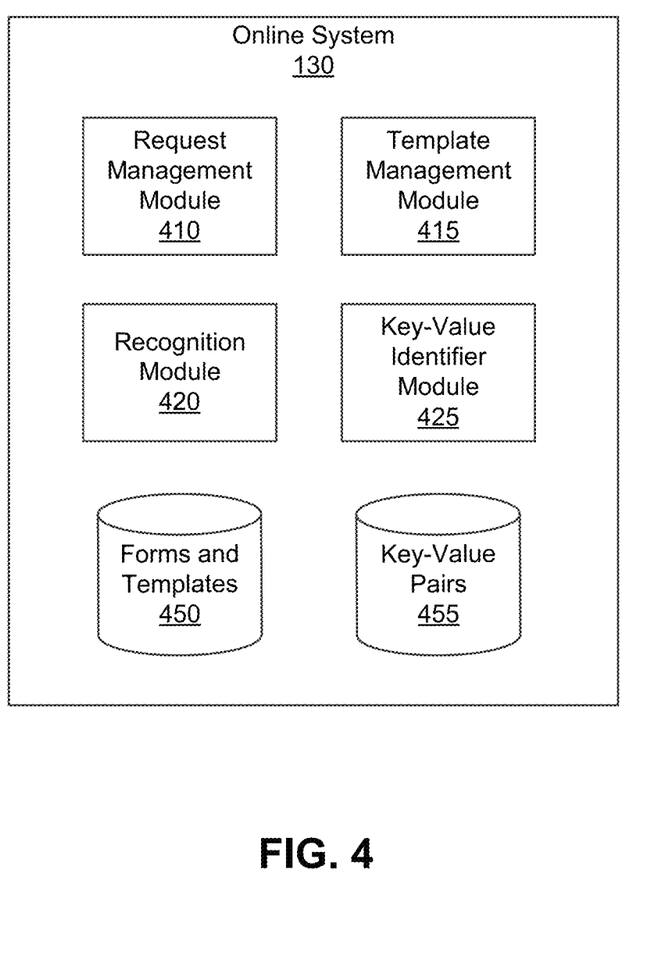
FIG. 4 is a block diagram of an architecture of the online system, in accordance with an embodiment.

FIG. 4 is a high-level block diagram illustrating a detailed view of the online system 130, in accordance with an embodiment. The online system 130 is comprised of modules including a request management module 410, a template management module 415, a recognition module 420, and a key-value identifier module 425. The online system 130 also includes a forms and templates datastore 450 and a key-value pairs datastore 455. Some embodiments of the online system 130 have different modules than those described here. Similarly, the functions can be distributed among the modules in a different manner than is described here.

The request management module 410 receives requests to process digital documents from client devices 110 and provides the users of the requests with the extracted information. Specifically, the request management module 410 may receive a request including an image of a document and may apply pre-processing techniques to the image before the information is extracted from the document. For example, the request management module 410 may perform cropping, image enhancement techniques, scaling, translation, or rotation of the document, and provide the pre-processed image to the recognition module 420. The request management module 410 may store the documents in the forms and templates datastore 450.

Moreover, the request may also include a customized document template from the user of the request that specifies the one or more fields to be extracted from the document and any candidate keys or known keys for the fields. The request management module 410 may receive a customized document template and forward the template to the template management module 415. The request management module 410 may also store any customized templates received in the forms and templates datastore 450.

Responsive to receiving information extracted from the document of the request from modules of the online system 130, the request management module 410 provides this information to the user of the request. Specifically, the request management module 410 may receive the extracted information in the form of key-value pairs that can be provided to the user in an appropriate format. In one instance, the request management module 410 provides the key-value pairs as text in a text file. In another instance, the request management module 410 provides the key-value pairs visually by annotating the document with the location of the identified key-value pairs. The annotations may be in the form of bounding boxes that are rectangles enclosing the key-value pairs or segmentation that outlines the actual texts of the key-value pairs in the document.

The template management module 415 creates and manages templates for documents. In one embodiment, the template management module 415 receives a customized document template attached along with a request and may flag the customized template for any errors or incomplete information. For example, a template may include a set of fields but one or more of the fields of the template but may be missing candidate keys for the one or more fields. In such an instance, the template management module 415 may generate candidate keys for a field based on, for example, previous instances of documents that were processed by the online system 130. For example, the template management module 410 may generate candidate keys for a field of invoice number based on keys that were previously identified by the online system 130 for invoice documents.

In another embodiment, the template management module 415 may determine that a document for a request is not associated with any form template. In such an instance, the template management module 415 may create a template for the document based on, for example, previous instances of documents that were processed by the online system 130. For example, the template management module 415 may generate a form template for a document based on templates that were generated or received for the same type of document (e.g., invoices, applications, government forms), for documents that originated from the same issuing entity, or for documents of the same authorship. The template management module 415 stores the templates in the forms and templates datastore 450, each in association with a respective document of a request.

The recognition module 420 receives documents included in requests and identifies a set of phrases and locations of the phrases on the documents. A phrase may be defined as a grouping of one or more words on a document that are placed spatially close to each other. In one embodiment, a group of one or more words is identified as a phrase on a document if the horizontal distance between the words are smaller than a predetermined threshold. The recognition module 420 may perform a text recognition method, such as optical character recognition (OCR) or application of a machine-learned model to identify words and groupings of words as phrases on the document. The recognition module 420 also associates each phrase with a location on the document. For example, the recognition module 420 may generate a bounding box enclosing a phrase and determine the spatial coordinates of the bounding box as the location of the phrase. The spatial coordinates may be defined as $\{x_{min}, y_{min}, x_{max}, y_{max}\}$, where $x_{min}$ is the leftmost horizontal coordinate, $y_{min}$ is the lowest vertical coordinate, $x_{max}$ is the rightmost horizontal coordinate, and $y_{max}$ is the uppermost vertical coordinate of the bounding box.

The key-value identifier module 425 receives documents and the set of phrases and templates for the documents, and extracts information in the form of key-value pairs. For at least one field specified in the template, the key-value identifier module 425 determines key scores for the set of phrases of the respective document. In one embodiment, the key-value identifier module 425 determines a key score for a phrase for a given field based on a string matching between the phrase and the candidate keys for the field. In one instance, the string matching is a fuzzy matching between the phrase and the candidate keys for the field, and the key-value identifier module 425 generates a matching score between a phrase and a candidate key for the field that indicates the similarity between the two texts. The key score for the phrase is the maximum matching score among the candidate keys.

The key-value identifier module 425 also identifies a set of candidate values for the field from the set of phrases of the document. In one embodiment, the key-value identifier module 425 determines a data type for the value of the field and selects only those phrases that match the data type. In one instance, the key-value identifier module 425 generates a set of categories and tags the field with one or more categories, including but not limited to, person names, organizations, locations, cardinal numbers, medical codes, time expressions (e.g., date or time), quantities, monetary values, percentages, and the like. The key-value identifier module 425 applies a named entity recognizer (NER) model to determine whether a phrase belongs to a category that matches the one or more categories of the field, and may select only those phrases that match as the candidate values of the field.

The key-value identifier module 425 identifies a set of neighbors for each candidate value from the set of phrases that are spatially close to the candidate value on the document. In one embodiment, neighbor phrases for a candidate value are those that have a spatial location within a predetermined distance from the location of the candidate value on the document. For example, neighbor phrases for a candidate value may be those that have a bounding box that overlaps significantly, e.g., above 90%, 80%, or 70%, with an area of the bounding box of the respective candidate value.

The key-value identifier module 425 determines neighbor scores for candidate value-neighbor pairs, where a neighbor score for a candidate value and a respective neighbor is determined based on the key score for the neighbor and a spatial score that indicates the spatial relationship of the neighbor to the candidate value. In one embodiment, the spatial score is given by a combination of a distance score and an angle score, for example, a weighted sum of the distance score and an angle score, and may be given by:

$$R(candidate_i, neighbor_j) = \text{dist}(candidate_i, neighbor_j) + \alpha \cdot \text{angle}(candidate_i, neighbor_j)$$

where $$\text{dist}(candidate_i, neighbor_j) = \text{Gaussian}(distance_{ij} | \mu=0, \beta=z_1)$$

$$\text{angle}(candidate_i, neighbor_j) = \text{Gaussian}(angle_{ij} | \mu=0, \delta=z_2)$$

where $distance_{ij}$ is the distance between the location (e.g., center of the bounding box) of the candidate value i and the location of the neighbor j on the document, and $angle_{ij}$ is the angle between the location of the candidate value and the location of the neighbor on the document, and $\alpha$ is a parameter.

Specifically, the key-value identifier module 425 determines the distance score as a function of the distance $distance_{ij}$ between the candidate value and the location of a neighbor on the document, where in one instance, the function is a Gaussian (or any other probability distribution) that receives the distance as input and is centered around a mean of 0 and a standard deviation of $z_1$. Similarly, the key-value identifier module 425 determines the angle score as a function of the angle $angle_{ij}$ between the location of the candidate value and the location of a neighbor on the document, where in one instance, the function is a Gaussian (or any other probability distribution) that receives the angle as input and is centered around a mean of 0 and a standard deviation of $z_2$. In one instance, the angle $angle_{ij}$ is given as the minimum angle distance between a location (e.g., center of bounding box) of the candidate value i and the location of the neighbor j with respect to a set of anchor angles, for example, the set of anchor angles can be {0°, 90°} if the key-value pairs are likely to be arranged horizontally left to right (e.g., anchor angle of 0°) or vertically up and down (e.g., anchor angle of 90°) on the document. Thus, the spatial score increases for a candidate value-neighbor pair that have a close distance to each other and are aligned with each other on the document.

In one instance, the neighbor score ns(•) for a candidate value and a respective neighbor is given by:

$$ns(candidate_i, neighbor_j) = R(candidate_i, neighbor_j) \times KeyScore_j$$

where $KeyScore_j$ is the key score for neighbor j. In other words, the neighbor score ns(•) is given by a combination of the key score for the neighbor and the spatial score between the candidate value and the neighbor. The key-value identifier module 425 may determine a final ranking score for a candidate value as the maximum of its neighbor scores.

The key-value identifier module 425 selects a candidate value and a respective neighbor based on the ranking scores and sets the selected candidate value as the value for the field and the selected neighbor as the key for the field. For example, the key-value identifier module 425 may select the candidate value-neighbor pair having the highest-ranking score as the final key-value pair for the field. The key-value identifier module 425 repeats this process for other fields specified in the document template to extract the remainder of the information in the form of key-value pairs. The key-value identifier module 425 stores the extracted information in the key-value pairs datastore 455 and provides the extracted information to the request management module 410, such that the request management module 410 can provide this information to the user of the request.

Method of Determining Key-Value Pairs from Digital Documents

Figure 5:
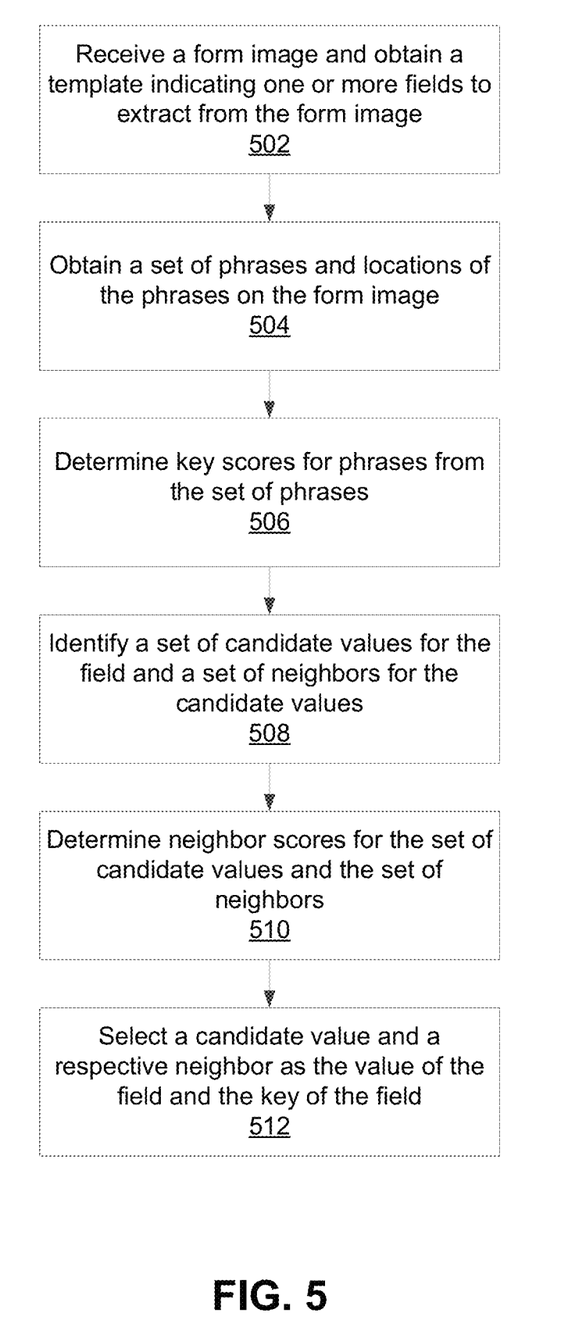
FIG. 5 illustrates a flowchart for a method of determining key-value pairs in a form document, in accordance with an embodiment.

FIG. 5 illustrates a flowchart for a method of determining key-value pairs in a form document, in accordance with an embodiment. In one embodiment, the process of FIG. 5 is performed by various modules of the online system 130. Other entities may perform some or all of the steps of the process in other embodiments. Likewise, embodiments may include different and/or additional steps, or perform the steps in different orders.

The online system 130 receives 502 a form image from a client device and obtains a template indicating one or more fields to extract form the form image. At least one field is associated with a set of candidate keys for the field. The online system 130 obtains 504, from the form image, a set of phrases and obtains locations of the set of phrases on the document. For at least one field, the online system 130 determines 506 key scores for the set of phrases. A key score for a phrase may indicate a likelihood that the phrase is a key for the field on the document. The online system 130 identifies 508 a set of candidate values for the field from the set of phrases and identifies a set of neighbors for each candidate value from the set of phrases.

The online system 130 determines 510 neighbor scores for the set of candidate values and the set of neighbors. A neighbor score for a candidate value and a respective neighbor may be determined from the key score for the neighbor and a spatial relationship of the neighbor to the candidate value. The online system 130 selects 512 a candidate value and a respective neighbor associated with a neighbor score above a threshold and sets the selected candidate value as a value of the field and the selected neighbor as the key of the field. The online system 130 may repeat steps 506 through 512 for remaining fields specified in the document template.

Computer Architecture

Figure 6:
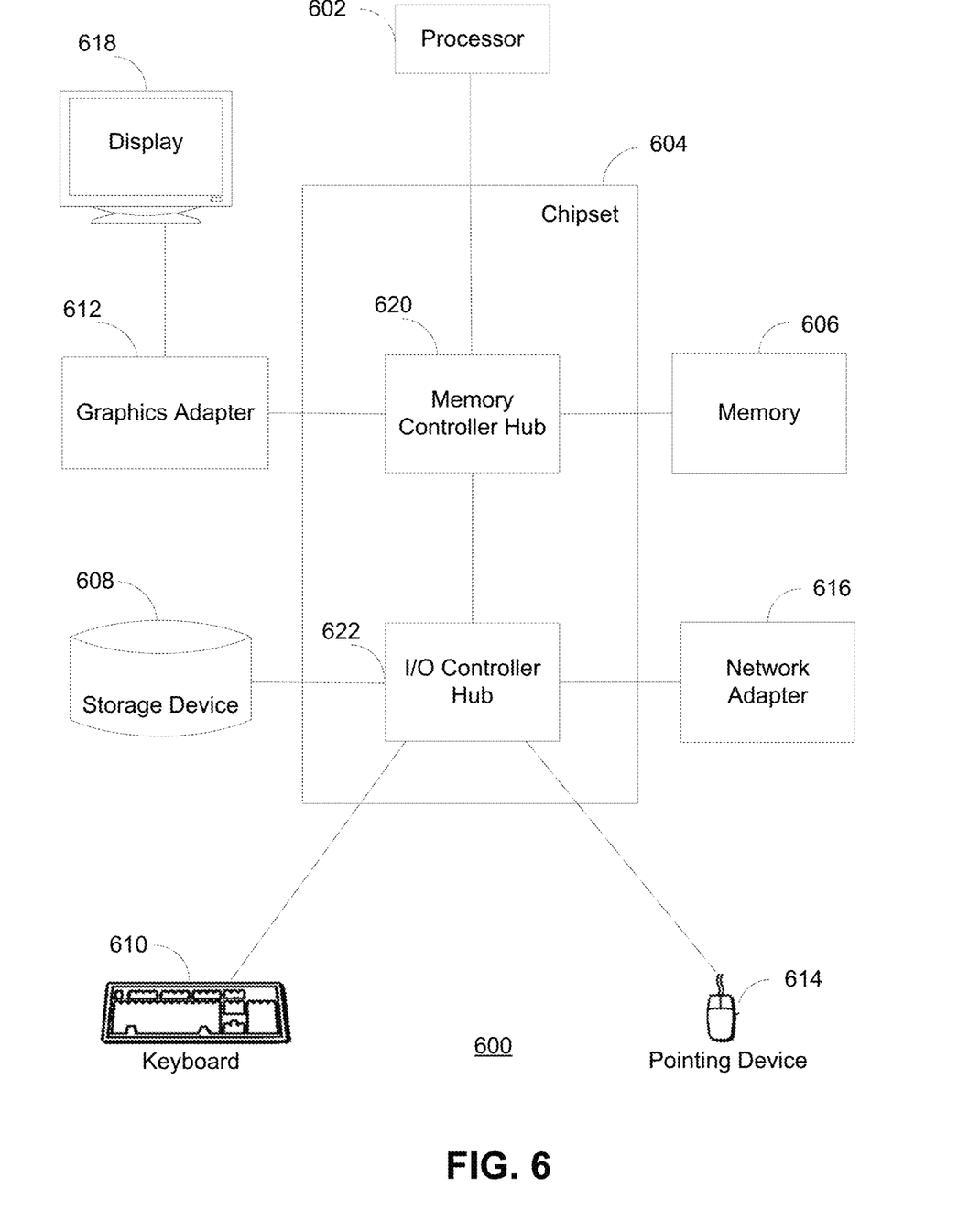
FIG. 6 is a block diagram illustrating the architecture of a typical computer system for use in the environment of FIG. 1, in accordance with an embodiment.

FIG. 6 is a block diagram illustrating the architecture of a typical computer system for use in the environment of FIG. 1 according to one embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is a non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer system 600. The graphics adapter 612 displays images and other information on the display 618. The network adapter 616 couples the computer system 600 to a network.

As is known in the art, a computer 600 can have different and/or other components than those shown in FIG. 6. In addition, the computer 600 can lack certain illustrated components. For example, a computer system 600 acting as an online system 130 may lack a keyboard 610 and a pointing device 614. Moreover, the storage device 608 can be local and/or remote from the computer 600 (such as embodied within a storage area network (SAN)).

The computer 600 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 608, loaded into the memory 606, and executed by the processor 602.

The types of computer systems 600 used by the entities of FIG. 1 can vary depending upon the embodiment and the processing power used by the entity. For example, a client device 110 may be a mobile phone with limited processing power, a small display 618, and may lack a pointing device 614. The online system 130 in contrast, may comprise multiple blade servers working together to provide the functionality described herein.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method, comprising:
receiving, from a client device, a form image;
obtaining a template indicating one or more fields to extract from the form image,
wherein at least one field is associated with a set of candidate keys for the field;
obtaining, from the form image, a set of phrases and obtaining locations of phrases; and
for the at least one field:
determining key scores for phrases from the set of phrases, a key score for a phrase indicating a likelihood that the phrase is a key for the field on the form,
identifying a set of candidate values for the field from the set of phrases,
determining a set of candidate value-neighbor pairs by identifying a set of neighbors for candidate values from the set of phrases,
determining neighbor scores for the set of candidate value-neighbor pairs, each neighbor score for each candidate value-neighbor pair determined from a combination of the key score for the neighbor of the candidate value-neighbor pair and a spatial relationship of the neighbor to the candidate value for the candidate value-neighbor pair,
selecting a candidate value-neighbor pair associated with a neighbor score above a threshold, and
setting the selected candidate value as a value of the field and the selected neighbor as the key of the field.

2. The computer-implemented method of claim 1, wherein the key score for a phrase is determined by performing string matching between the phrase and the candidate keys associated with the field to determine a degree of similarity between the phrase and the candidate keys.

3. The computer-implemented method of claim 1, wherein the neighbors for a candidate value have locations on the form image within a threshold distance from a location of the candidate value.

4. The computer-implemented method of claim 1, wherein at least a part of information included in the template for the form image is received from the client device.

5. The computer-implemented method of claim 1, wherein identifying the set of candidate values further comprises:
determining a data type of the at least one field by assigning the at least one field to at least one of a predetermined set of categories, and
selecting a subset of phrases in the set of phrases that match the data type of the at least one field as the candidate values of the at least one field.

6. The computer-implemented method of claim 1, wherein the spatial relationship of the neighbor to the candidate value is determined based on a combination of a distance between a location of the candidate value and a location of the respective neighbor on the form image and an angle between the location of the candidate value and the location of the respective neighbor on the form image.

7. The computer-implemented method of claim 1, further comprising providing the key for the at least one field and the value for the at least one field to a user of the client device.

8. A non-transitory computer-readable storage medium storing computer program instructions executable to perform operations, the operations comprising:
receiving, from a client device, a form image;
obtaining a template indicating one or more fields to extract from the form image, wherein at least one field is associated with a set of candidate keys for the field;
obtaining, from the form image, a set of phrases and obtaining locations of phrases; and
for the at least one field:
determining key scores for phrases from the set of phrases, a key score for a phrase indicating a likelihood that the phrase is a key for the field on the form,
identifying a set of candidate values for the field from the set of phrases,
determining a set of candidate value-neighbor pairs by identifying a set of neighbors for candidate values from the set of phrases, determining neighbor scores for the set of candidate value-neighbor pairs, each neighbor score for each candidate-value pair determined from a combination of the key score for the neighbor of the candidate value-neighbor pair and a spatial relationship of the neighbor to the candidate value for the candidate value-neighbor pair, selecting a candidate value-neighbor pair associated with a neighbor score above a threshold, and setting the selected candidate value as a value of the field and the selected neighbor as the key of the field.

9. The non-transitory computer-readable storage medium of claim 8, wherein the key score for a phrase is determined by performing string matching between the phrase and the candidate keys associated with the field to determine a degree of similarity between the phrase and the candidate keys.

10. The non-transitory computer-readable storage medium of claim 8, wherein the neighbors for a candidate value have locations on the form image within a threshold distance from a location of the candidate value.

11. The non-transitory computer-readable storage medium of claim 8, wherein at least a part of information included in the template for the form image is received from the client device.

12. The non-transitory computer-readable storage medium of claim 8, wherein identifying the set of candidate values further comprises:

determining a data type of the at least one field by assigning the at least one field to at least one of a predetermined set of categories, and selecting a subset of phrases in the set of phrases that match the data type of the at least one field as the candidate values of the at least one field.

13. The non-transitory computer-readable storage medium of claim 8, wherein the spatial relationship of the neighbor to the candidate value is determined based on a combination of a distance between a location of the candidate value and a location of the respective neighbor on the form image and an angle between the location of the candidate value and the location of the respective neighbor on the form image.

14. The non-transitory computer-readable storage medium of claim 8, wherein the operations further comprise providing the key for the at least one field and the value for the at least one field to a user of the client device.

15. A system, comprising:
a processor for executing computer program instructions; and
a non-transitory computer-readable storage medium storing computer program instructions executable to perform steps comprising:
receiving, from a client device, a form image;
obtaining a template indicating one or more fields to extract from the form image, wherein at least one field is associated with a set of candidate keys for the field;

obtaining, from the form image, a set of phrases and obtaining locations of phrases; and for the at least one field:
determining key scores for phrases from the set of phrases, a key score for a phrase indicating a likelihood that the phrase is a key for the field on the form, identifying a set of candidate values for the field from the set of phrases, determining a set of candidate value-neighbor pairs by identifying a set of neighbors for candidate values from the set of phrases, determining neighbor scores for the set of candidate value-neighbor pairs, each neighbor score for each candidate value-neighbor pair determined from a combination of the key score for the neighbor of the candidate value-neighbor pair and a spatial relationship of the neighbor to the candidate value for the candidate value-neighbor pair, selecting candidate value-neighbor pair associated with a neighbor score above a threshold, and setting the selected candidate value as a value of the field and the selected neighbor as the key of the field.

16. The system of claim 15, wherein the key score for a phrase is determined by performing string matching between the phrase and the candidate keys associated with the field to determine a degree of similarity between the phrase and the candidate keys.

17. The system of claim 15, wherein the neighbors for a candidate value have locations on the form image within a threshold distance from a location of the candidate value.

18. The system of claim 15, wherein at least a part of information included in the template for the form image is received from the client device.

19. The system of claim 15, wherein identifying the set of candidate values further comprises:

determining a data type of the at least one field by assigning the at least one field to at least one of a predetermined set of categories, and selecting a subset of phrases in the set of phrases that match the data type of the at least one field as the candidate values of the at least one field.

20. The system of claim 15, wherein the spatial relationship of the neighbor to the candidate value is determined based on a combination of a distance between a location of the candidate value and a location of the respective neighbor on the form image and an angle between the location of the candidate value and the location of the respective neighbor on the form image.

* * * * *